United States Patent Office 3,271,191
Patented Sept. 6, 1966

3,271,191
METHOD OF MAKING MANGANESE FERRITE FILM FROM NITRATE SOLUTION
William L. Wade, Jr., Neptune, N.J., assignor to the United States of America as represented by the Secretary of the Army
No Drawing. Filed Nov. 8, 1962, Ser. No. 236,459
3 Claims. (Cl. 117—169)

The invention described herein may be manufactured and used by or for the Government for governmental purposes without the payment of any royalty thereon.

This invention relates to a simple method of making magnetic ferrite films, and particularly, to a method of making manganese ferrite and manganese-magnesium ferrite films from nitrate solution.

An object of the invention is to make magnetic manganese ferrite and manganese-magnesium ferrite films of high compositional purity by a relatively short and simple technique.

Magnetic ferrite films are relatively new. They are adaptable for use in computer memories, logic circuits, and microwave devices. One very promising application of the magnetic ferrite films is in the traveling-wave maser structure wherein their use provides for an unconditionally-stable maser amplifier. The use of magnetic ferrite films is of distinct advantage over the use of bulk ferrite in microwave devices at high frequencies. This is because one cannot grind solid ferrite materials thin or uniform enough to fit into such devices. The magnetic ferrite films on the other hand are suitable in these devices as they can be coated to any thickness and be cut to any desired shape. Alternatively, the films can be of economic advantage in that the substrate can be cut to the desired shape beforehand and then coated.

Heretofore, many of these films have been made by the vacuum deposition technique of vaporizing the metals on suitable substrates and then heating or rather firing the metals at high temperatures for prolonged periods to convert the metals to oxides and alignment to the ferrite film.

It has now been found that magnetic manganese ferrite and manganese-magnesium ferrite films of high compositional purity can be made by a relatively short and simple technique. The technique involves the dissolving of ferric nitrate and either manganese nitrate, or manganese nitrate and magnesium nitrate, in alcohol at room temperature; immersing the surface of a substrate in the solution; preliminarily firing the coated substrate at 400° C. to 700° C. and successively cooling to room temperature between coats. After weighing on a balance to determine exact amounts of material deposited, the coated substrate is fired at 800° C. to 1000° C. in an inert atmosphere for one to four hours to align the oxides formed to the spinel structure of the ferrite.

The alcohol solvent recited in the above method is preferred as the dispersing agent or carrier. That is, it gives proper flow tendencies to the film forming solution of metallic nitrates. Other solvents that aid in evaporation and dispersion of the nitrates could be used in its place as, for example, a hydrocarbon solvent or a lower ketone. In no instance, it should be pointed out, is there a reaction between the metallic nitrate and the particular dispersing agent or carrier selected. Thus, for example, a metallic alcoholate is not formed when carrying out the method.

A practical variation in the method is to initially melt the metallic nitrate and then to add just enough water to it to maintain a liquid state. The particular dispersing agent selected can then be added to stoichiometric ratios of the stable aqueous stock solution at the time of carrying out the method. Though this technique is not necessary to the invention, it is of distinct advantage where the solution resulting from the dispersion of the metallic nitrate directly in the alcohol would be unstable after three to four days, as for example, in the case of ferric nitrate.

Example 1.

Managanese nitrate is reacted with ferric nitrate in such amounts that one mole of manganese is present for every two moles of iron according to the reaction

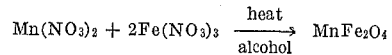
$$Mn(NO_3)_2 + 2Fe(NO_3)_3 \xrightarrow[\text{alcohol}]{\text{heat}} MnFe_2O_4$$

According to the method, a stable aqueous stock solution of manganese nitrate is first prepared by reacting 11 grams of manganese powder (Fisher Cat; M–78) with 50 milliliters of 20 percent nitric acid; the manganese nitrate obtained being in a liquid state. The metal concentration analyzes as 0.1848 gram of manganese per milliliter of solution. A stable aqueous stock solution of ferric nitrate is then prepared by melting ferric nitrate nonahydrate crystals without causing decomposition at 100° C. and adding just enough water to maintain a liquid state. The metal concentration analyzes as 0.1305 gram of iron per milliliter of solution.

A stoichiometric ratio of the above stock solutions is prepared by mixing 5.5 milliliters including 5 percent excess of the stock solution of manganese nitrate in water containing 1.0164 grams of manganese with 15 milliliters of a stock solution of ferric nitrate in water containing 1.9575 grams of iron. 100 milliliters of methanol is added to the resulting solution. A fused quartz substrate is then dipped in the stoichiometric alcoholic nitrate solution allowing the excess to flow back. The substrate is then placed in a furnace set at 500° C. for 60 to 90 seconds, removed, and then cooled to room temperature. During this preliminary heating, nitric oxide fumes evolve causing flaking of material at varied spots upon the surface of the fused quartz. The flakes are gently removed and the substrate redipped in the solution repeating the above mentioned procedure until an even coat of a desired thickness is obtained. Between 0.5 and 1.0 milligram of material is deposited during each operation. The substrate is then fired at 900° C. for one hour under a nitrogen gas atmosphere to align the metallic oxides formed (that is MnO and $Fe_2O_3$) to the spinel structure of the ferrite. X-ray diffraction techniques carried out on the coated substrate indicate that the deposited coating corresponds to a manganese ferrite spinel structure. Microwave measurements made by plotting attenuation versus applied field resulted in absorption curves that show a definite activity at microwave frequencies indicating the film to be ferromagnetic.

Example 2

Manganese nitrate is reacted with magnesium nitrate and ferric nitrate in such amounts that one-half mole of manganese is present for every one-half mole of magnesium and for every 2 moles of iron according to the reaction

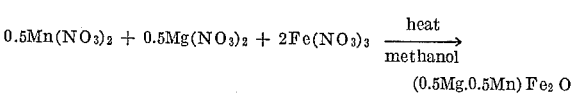
$$0.5Mn(NO_3)_2 + 0.5Mg(NO_3)_2 + 2Fe(NO_3)_3 \xrightarrow[\text{methanol}]{\text{heat}}$$
$$(0.5Mg.0.5Mn)Fe_2O$$

According to the method, a stable aqueous stock solution of manganese nitrate is first prepared by reacting manganese powder (Fisher Cat; M–78) with 50 milliliters of 20 percent nitric acid; the manganese nitrate obtained being in a liquid state. The metal concentration analyzes as 0.2815 gram of manganese per milliliter of solution. A stable aqueous stock solution of ferric nitrate is then prepared by melting ferric nitrate nonahydrate crystals without causing decomposition at 100°

C. and adding just enough water to maintain a liquid state. The metal concentration analyzes as 0.1552 gram of iron per milliliter of solution. A magnesium stock solution is then prepared by dissolving 43 grams of magnesium nitrate directly in 50 milliliters of anhydrous ethanol. The metal concentration analyzes as 0.0529 gram of magnesium per milliliter of solution.

A stoichiometric ratio of the above stock solutions is prepared by mixing 1.42 milliliters including 5 percent excess of the stock solution of manganese nitrate in water containing 0.4008 gram of manganese with 3.19 milliliters of the stock solution of magnesium nitrate containing 0.1689 gram of magnesium and with 10.0 milliliters of the stock solution of iron nitrate in water containing 1.5520 grams of iron. 100 milliliters of methanol is then added to the resulting solution. A 96 percent alumina substrate is then dipped in the stoichiometric alcoholic nitrate solution allowing the excess to flow back The remaining technique of obtaining the ferrite film is the same as in Example 1 except that the final firing is at 1000° C. for four hours. X-ray diffraction techniques carried out on the coated substrate indicate that the deposited coating corresponds to a magnesium manganese ferrite spinel structure of the formula $$(0.5Mg.0.5Mn)Fe_2O_4$$

An evaluation of the magnetic properties of the manganese magnesium ferrite films at microwave frequencies (X-band) is then made. In the evaluation, microwave measurements are made on a film 22.5 microns in thickness deposited on a 96 percent alumina substrate having the dimensions 0.9" x 0.4" plotting attenuation versus applied field. The resulting absorption curves show a definite activity at microwave frequencies and portray the films as being ferromagnetic. That is, the evaluation shows the resonant frequency of the film to be 9376 megacycles, the resonant applied field to be 2025 oersteds, and the line width to be 1125 oersteds.

The preliminary heating in Examples 1 and 2 above can be effected with the aid of a hot plate set on high. In such a case as is also true in Examples 1 and 2 above, both sides of the substrate are covered but only one is needed for evaluation. Therefore, one side is removed of its coating with acid or a razor blade.

The substrate used is not critical; all that is required is that it be temperature stable up to 1000° C. Alumina and fused quartz have been found to be most useful as the substrate. The final firing step to align the oxides formed to the ferrite structure should take place in an inert atmosphere at temperatures of 800° C. to 1000° C. for one to four hours.

In the aforementioned examples, the thickness of the coated substrate is determined by weighing out prescribed amounts of deposited material on the selected substrate, the selected substrate having a definite specified area. The substrate thickness is measured before and after deposition of the coating with a sensitive instrument such as an electronic micrometer. The calculated film thickness is then correlated with the weight of material deposited on the specified area. Once a correlation is made, only a deposited weight is required over a specified area.

In carrying out the method, the ratio in which the metallic nitrates can be reacted can be varied depending on the ionic radius of the metals, the valence of the metals, and the crystal structure of the ferrite itself.

It is intended that the foregoing description be considered merely as illustrative and not in limitation of the invention as hereinafter claimed.

What is claimed is:

1. The method of making magnetic ferrite films comprising mixing an alcoholic solution of ferric nitrate with an alcoholic solution of metallic nitrate selected from the group consisting of manganese nitrate and manganese nitrate-magnesium nitrate in the stoichiometric proportion necessary to form the ferrite, immersing a substrate into the thus prepared solution, preliminarily firing the coated substrate at 400° C. to 700° C., cooling the coated substrate, repeating the immersion, preliminary firing and cooling steps until the desired amount of magnetic ferrite material is deposited in situ on the substrate, and firing the coated substrate at 800° C. to 1000° C. in an inert atmosphere for one to four hours to align the oxides formed to the spinel structure of the ferrite.

2. The method of making magnetic ferrite films according to claim 1 wherein the alcoholic solution of ferric nitrate is mixed with an alcoholic solution of manganese nitrate.

3. The method of making magnetic ferrite films according to claim 1 wherein the alcoholic solution of ferric nitrate is mixed with alcoholic solutions of magnesium nitrate and manganese nitrate.

References Cited by the Examiner

UNITED STATES PATENTS

| | | | |
|---|---|---|---|
| 2,906,682 | 9/1959 | Fahnoe et al. | 204—181 |
| 3,023,165 | 2/1962 | Van Uitert | 252—62.5 |
| 3,096,206 | 7/1963 | Wade | 117—121 |
| 3,100,158 | 8/1963 | Lemaire et al. | 117—49 |
| 3,114,714 | 12/1963 | Braun et al. | 252—62.5 |
| 3,197,334 | 7/1965 | Wade | 117—169 |
| 3,227,653 | 1/1966 | Heinrich et al. | 252—62.5 |

WILLIAM D. MARTIN, *Primary Examiner.*

WILLIAM D. HERRICK, *Assistant Examiner.*